(12) United States Patent
Zhao et al.

(10) Patent No.: US 9,942,150 B2
(45) Date of Patent: Apr. 10, 2018

(54) METHOD FOR OPTIMIZING THROUGHPUT OF A NETWORK

(71) Applicant: Macau University of Science and Technology, Taipa (MO)

(72) Inventors: Qinglin Zhao, Taipa (MO); Zhijie Ma, Taipa (MO)

(73) Assignee: MACAU UNIVERSITY OF SCIENCE AND TECHNOLOGY, Taipa (MO)

( * ) Notice: Subject to any disclaimer, the term of this patent is extended or adjusted under 35 U.S.C. 154(b) by 82 days.

(21) Appl. No.: 15/160,043

(22) Filed: May 20, 2016

(65) Prior Publication Data

US 2017/0339058 A1 Nov. 23, 2017

(51) Int. Cl.
*G08C 15/00* (2006.01)
*H04L 12/801* (2013.01)
*H04L 12/911* (2013.01)
*H04L 12/26* (2006.01)

(52) U.S. Cl.
CPC .......... *H04L 47/10* (2013.01); *H04L 43/0882* (2013.01); *H04L 47/783* (2013.01)

(58) Field of Classification Search
CPC .... H04L 47/10; H04L 43/0882; H04L 47/783
USPC ........................................ 370/229
See application file for complete search history.

(56) References Cited

U.S. PATENT DOCUMENTS

2011/0249568 A1* 10/2011 Desai ............... H04L 12/413
                                                    370/242
2012/0163218 A1*  6/2012 Kim ................ H04W 74/08
                                                    370/252

OTHER PUBLICATIONS

Yuna Le et al., Maximizing Throughput When Achieving Time Fairness in Multi-Rate Wireless LANs, Feb. 2014. (From Applicant's IDS filed on Jan. 9, 2017 ).*
J. Gubbi, R. Buyya, S. Marusic, and M. Palaniswami, "Internet of Things (IoT): A Vision, Architectural Elements, and Future Directions", Future Generation Computer Systems, vol. 29, No. 7, pp. 1-19, 2013.
F. Viani, F. Robol, A. Polo, P. Rocca, G. Oliveri, and A. Massa, "Wireless Architectures for Heterogeneous Sensing in Smart Home Applications: Concepts and Real Implementation", Proceedings of the IEEE, vol. 101, No. 11, pp. 2381-2396, Nov. 2013.

(Continued)

*Primary Examiner* — Mang Yeung
(74) *Attorney, Agent, or Firm* — Renner Kenner Greive Bobak Taylor & Weber (57) ABSTRACT

A method for optimizing throughput of a network with stations adapted to transmit data to an access point includes the step of determining a respective required throughput for each station based on: respective time periods required for decreasing a count of a respective back-off counter associated with each of the stations, a transmission packet length of the respective station, and a probability of successful transmission for of the respective station. The respective required throughput so determined is a function of a respective transmission attempt rate for the station. The method further includes the step of determining the respective transmission attempt rate for each station for maximizing a sum of the respective required throughput such that a respective fixed throughput is provided for inelastic data flow in the network, a respective proportional throughput ratio is provided for elastic data flow in the network, and the throughput of the network is maximized.

16 Claims, 5 Drawing Sheets

(56) References Cited

OTHER PUBLICATIONS

L. Jiang, D-Y. Liu, and B. Yang, "Smart Home Research", Proceedings of the Third International Conference on Machine Learning and Cybernetics, vol. 2, pp. 659-663, 2004.

S. M. Amin and B. F. Wollenberg, "Toward a Smart Grid", IEEE Power and Energy Magazine, vol. 3, No. 5, pp. 34-41, Sep./Oct. 2005.

E. Khorov, A. Lyakhov, A. Krotov, and Andrey Guschin, "A survey on IEEE 802.11ah: An enabling networking technology for smart cities", Computer Communications, vol. 58, pp. 53-69, 2015.

J-W. Lee, M. Chiang, and A. R. Calderbank, "Utility-Optimal Random-Access Control", IEEE Transactions on Wireless Communications, vol. 6, No. 7, pp. 2741-2751, Jul. 2007.

M. H. Cheung, H. Mohsenian-Rad, V. W. S. Wong, and R. Schober, "Utility-Optimal Random Access for Wireless Multimedia Networks", IEEE Wireless Communications Letters, vol. 1, No. 4, pp. 340-343, Aug. 2012.

D. Yoon, S. Lee, J. Hong, and K. Chung, "Weighted Bandwidth Sharing Scheme to Guarantee the Video Quality in Home Networks," In International Conference on Information Networking (ICOIN), pp. 423-427, IEEE 2013.

M. Nassiri, M. Heusse, and A. Duda, "A Novel Access Method for Supporting Absolute and Proportional Priorities in 802.11 WLANs", Proceedings of IEEE INFOCOM, pp. 1382-1390, Apr. 2008.

W. Zhong, Y. Fang, S. Jin, K-K. Wong, S. Zhong, and Z. Qian, "Joint Resource Allocation for Device-to-Device Communications Underlaying Uplink MIMO Cellular Networks", IEEE Journal on Selected Areas in Communications, vol. 33, No. 1, pp. 41-54, Jan. 2015.

W. Zhong, G. Chen, S. Jin, and K-K. Wong, "Relay Selection and Discrete Power Control for Cognitive Relay Networks via Potential Game", IEEE Transactions on Signal Processing, vol. 62, No. 20, pp. 5411-5424, Oct. 2014.

A. Banchs, X. Perez-Costa, and D. Qiao, "Providing Throughput Guarantees in IEEE 802.11e Wireless LANs", Proceedings of 18th International Teletraffic Congress, pp. 1001-1010, 2003.

Y. Le, L. Ma, W. Cheng, X. Cheng, and B. Chen, "Maximizing Throughput When Achieving Time Fairness in Multi-Rate Wireless LANs", The 31st Annual IEEE International Conference on Computer Communications: Mini-Conference, pp. 2911-2915, 2012.

W. Li, S. Wang, Y. Cui, X. Cheng, R. Xin, M. A. Al-Rodhaan, and A. Al-Dhelaan, AP Association for Proportional Fairness in Multirate WLANs, IEEE/ACM Transactions on Networking, vol. 22, No. 1, pp. 191-202, Feb. 2014.

G. Bianchi, "Performance Analysis of the IEEE 802.11 Distributed Coordination Function", IEEE Journal on Selected Areas in Communications, vol. 18, No. 3, pp. 535-547, Mar. 2000.

Q. Zhao, D. H. K. Tsang, and T. Sakurai, "A Novel CAC Scheme for Homogeneous 802.11 Networks", IEEE Transactions on Wireless Communications, vol. 9, No. 3, pp. 1168-1174, Mar. 2010.

D. Malone, K. Duffy, and D. Leith, "Modeling the 802.11 Distributed Coordination Function in Nonsaturated Heterogeneous Conditions", IEEE/ACM Transactions on Networking, vol. 15, No. 1, pp. 159-172, Feb. 2007.

F. P. Kelly, A. K. Maulloo, and D. K. H. Tan, "Rate control for communication networks: shadow prices, proportional fairness and stability", Journal of the Operational Research, vol. 49, pp. 237-252, 1998.

\* cited by examiner

METHOD FOR OPTIMIZING THROUGHPUT OF A NETWORK

TECHNICAL FIELD

The present invention relates to a method for optimizing throughput of a network and particularly, although not exclusively, to a method for scheduling channel access in a network with heterogeneous data traffic.

BACKGROUND

The concept of the Internet of Things (IoT) refers to a world in which every-day physical objects are embedded with sensors and actuators, and are linked to the Internet through wired or wireless networks such that data can be readily gathered, communicated and analysed, and that events can be readily responded to with minimal human intervention. In the era of IoT, physical objects can represent themselves digitally in the physical world to interact with other objects, thereby transforming the physical world into a huge information system. In one important aspect, IoT requires interconnection of various heterogeneous devices (laptops, smartphones, tablets, sensors, actuators, etc.), and the heterogeneity of these devices dictates the heterogeneity of the network and their application requirements.

Figure 1:
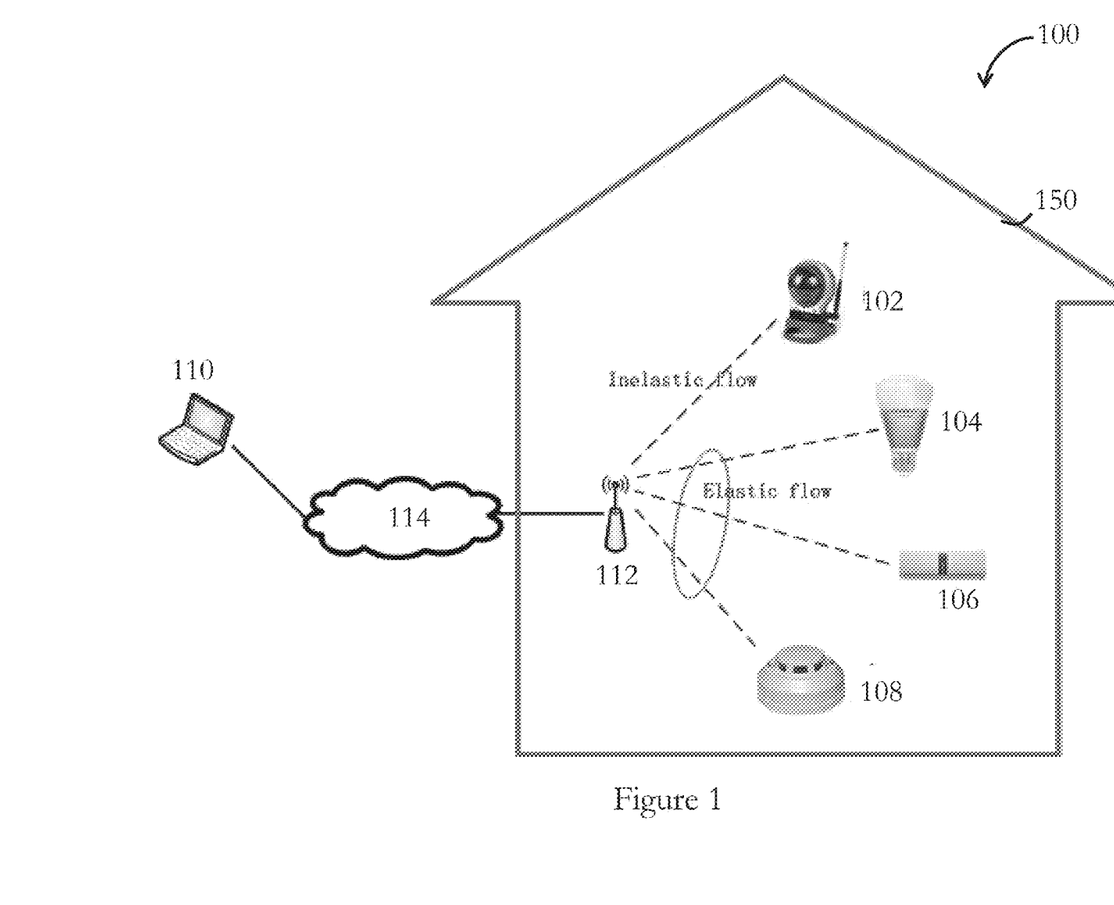
FIG. 1 is a schematic diagram of an exemplary smart home network in an IoT application.

FIG. 1 shows an exemplary smart home network 100 in one IoT application. As shown in FIG. 1, the network 100 includes a surveillance camera 102, a smart lamp 104, a smart air-conditioner 106, and a smoke detector 108 that are in wired or wireless connection with a smart home gateway 112 (i.e., an access point), in the same house 150. The access point 112 is in turn connected to a remote information handling system 110 through the internet 114. Network 100 enables video surveillance and measurement of the home environment. In network 100, there exist two types of traffic flows with different service requirements, namely inelastic (or real-time) data flow and elastic (or non-real-time) data flow.

Inelastic data flow (e.g., video flow) generally has larger frame sizes and more stringent requirements in bandwidth and delay. In network 100, surveillance camera 102 is in inelastic data flow with the access point 112. Surveillance camera 102 transmits surveillance video to the access point 112, allowing user to remotely view the video, for example through the remote information handling system 110, to monitor the home environment. These videos consume a wide bandwidth and should be delivered in real-time.

On the other hand, elastic data flow generally has smaller frame sizes and more flexible requirements in bandwidth and delay. In network 100, one or more of the smart lamp 104, the smart air-conditioner 106, and the smoke detector 108 are in elastic data flow with the access point 112. In one example, the smart lamp 104 and the smart air-conditioner 106 transmit non-real-time home environment information, such as temperature and luminance measured by their own built-in sensors, to access point 112. The access point 112 may, in response, transmit control commands to the lamp 104 and the air-conditioner 106 for adjusting corresponding parameter settings based on the received information. In this case, the amount of data that needs to be transmitted may vary based on a variation of temperature and luminance in the environment.

In a network with limited bandwidth and where these elastic and inelastic data flows coexist, it is desirable to economically allocate bandwidth in a simple and efficient manner.

SUMMARY OF THE INVENTION

In accordance with a first aspect of the present invention, there is provided a method for optimizing throughput of a network with stations adapted to transmit data to an access point, the method comprising the steps of: determining a respective required throughput ($\Gamma_i$) for each station (i) based on: respective time periods ($\Omega$) required for decreasing a count of a respective back-off counter associated with each of the stations (i), a transmission packet length ($L_i$) of the respective station (i), and a probability of successful transmission ($P_s^i$) of the respective station (i), wherein the respective required throughput ($\Gamma_i$) so determined is a function of a respective transmission attempt rate ($\beta_i$) for the station (i); and determining the respective transmission attempt rate ($\beta_i$) for each station (i) for maximizing a sum of the respective required throughput ($\Gamma_i$) such that a respective fixed throughput ($a_i$) is provided for inelastic data flow in the network, a respective proportional throughput ratio ($r_i$) is provided for elastic data flow in the network, and the throughput of the network is maximized. Preferably, the respective fixed throughput ($a_i$) is an optimal throughput for inelastic data flow, without under- or over-allocation.

In one embodiment of the first aspect, the method further comprises the step of operating the stations (i) at the respective determined transmission attempt rate ($\beta_i$).

In one embodiment of the first aspect, the fixed throughputs ($a_i$) are respective predetermined throughputs for maintaining inelastic data flow in the respective stations.

In one embodiment of the first aspect, the respective proportional throughput ratio ($r_i$) is defined as a ratio of a throughput of one of the station with elastic data flow to a throughput of another of the station with elastic data flow.

In one embodiment of the first aspect, the method further comprises the step of determining or selecting an operation mode of the network.

In one embodiment of the first aspect, the operation mode is selected from a basic mode and a RTS/CTS mode.

In one embodiment of the first aspect, in the basic mode, the respective time periods ($\Omega$) is defined by:

$$\Omega = \begin{cases} \sigma, & P_e = \prod_{i=1}^{N}(1-\beta_i), \\ T_i, & P_i = \beta_i \prod_{j=i+1}^{N}(1-\beta_j), \ 1 \le i \le N-1 \end{cases};$$

and in the RTS/CTS mode, the respective time periods ($\Omega$) is defined by:

$$\Omega = \begin{cases} \sigma, & P_e \\ T_s^i, & P_s^i, \ 1 \le i \le N, \\ T_c, & P_c \end{cases}$$

where N is a total number of the stations; $\sigma$ is a predetermined time constant; $P_e$ is an idle probability that all of the stations do not transmit in a slot; $T_i$ is a channel occupation time that when one station i transmits but other stations i+1 to N do not transmit; $P_i$ is a probability that one station i transmits but other stations i+1 to N do not transmit, with $\prod_{j=N=1}^{N}(1-\beta_j)=1$; $T_s^i$ is the successful packet transmission time of station i; $P_s^i$ is the probability of a successful transmission of station i; $T_c$ is an unsuccessful packet transmission time; and $P_c$ is the probability of an unsuccessful transmission of station i.

In one embodiment of the first aspect, the respective required throughput ($\Gamma_i$) for each station (i) is expressed as:

$$\Gamma_i(\beta) = \frac{L_i P_s^i}{E(\Omega)},$$

where $P_s^i = \beta_i \Pi_{j \neq i}^N (1-\beta_j)$, $1 \leq i \leq N$; $E(\Omega) = \sigma P_e + \Sigma_{i=1}^{N-1} T_s P_i$ for the basic mode; and $E(\Omega) = \sigma P_e + \Sigma_{i=1}^N T_s^i P_s^i + T_c P_c$ for the RTS/CTS mode.

In one embodiment of the first aspect, the step of determining a respective transmission attempt rate ($\beta_i$) for each station (i) comprises the steps of: processing the respective required throughput ($\Gamma_i$) for each station (i) with a utility function for elastic data flow and inelastic data flow; and determining a respective transmission attempt rate ($\beta_i$) for each station (i) for maximizing the utility functions.

In one embodiment of the first aspect, the step of processing the respective required throughput ($\Gamma_i$) for each station (i) with a utility function is performed based on:

$$U_i(\beta) = \begin{cases} 1, & \text{if } \Gamma_i(\beta) \geq a_i \\ 0, & \text{if } \Gamma_i(\beta) < a_i \end{cases} \text{ for inelastic data flow;}$$

and $$U_i(\beta) = r_i \ln \Gamma_i(\beta) \text{ for elastic data flow;}$$

where $U_i(\beta)$ is the utility function.

In one embodiment of the first aspect, the step of determining a respective transmission attempt rate ($\beta_i$) for each station (i) comprises the steps of: setting an initial transmission attempt rate; determining the respective transmission attempt rate ($\beta_i$) based on the initially set transmission attempt rate, the respective required throughput ($\Gamma_i$) for each station (i), and a predetermined relationship.

In one embodiment of the first aspect, the predetermined relationship is defined as:

$$\beta_1 = \frac{B + \sum_{j=1}^m (T_s^{j+1} - T_c)\beta_{j+1} + T_c e^\varphi}{A}$$

$$\beta_i = \frac{L_2 a_i}{a_2 L_i} \beta_2, 2 \leq i \leq n \text{ for inelastic data flow;}$$

and $$\beta_{n+i} = \frac{r_i \left( \varphi - \frac{L_2}{a_2}\beta_2 \sum_{j=2}^n \frac{a_j}{L_j} \right)}{L_{n+i} \sum_{j=1}^m \frac{r_j}{L_{n+j}}}, 1 \leq i \leq m$$

for elastic data flow; where $= \frac{L_1}{a_1} + \sigma - T_s^1$, $B = \sigma - T_s^1$, and $\phi > 0$ is an optimal total attempt rate of the stations with elastic data flow.

In one embodiment of the first aspect, the elastic data flow is a non-real-time data flow and the inelastic data flow is a real-time data flow.

In one embodiment of the first aspect, the network utilizes an IEEE 802.11 protocol.

In one embodiment of the first aspect, the network utilizes an IEEE 802.11ah protocol.

In accordance with a second aspect of the present invention, there is provided a non-transient computer readable medium for storing computer instructions that, when executed by one or more processors, causes the one or more processors to perform a method for optimizing throughput of a network with stations adapted to transmit data to an access point, the method comprising the steps of: determining a respective required throughput ($\Gamma_i$) for each station (i) based on: respective time periods ($\Omega$) required for decreasing a count of a respective back-off counter associated with each of the stations (i), a transmission packet length ($L_i$) of the respective station (i), and a probability of successful transmission ($P_s^i$) of the respective station (i), wherein the respective required throughput ($\Gamma_i$) so determined is a function of a respective transmission attempt rate ($\beta_i$) for the station (i); and determining the respective transmission attempt rate ($\beta_i$) for each station (i) for maximizing a sum of the respective required throughput ($\Gamma_i$) such that a respective fixed throughput ($a_i$) is provided for inelastic data flow in the network, a respective proportional throughput ratio ($r_i$) is provided for elastic data flow in the network, and the throughput of the network is maximized.

It is an object of the present invention to address the above needs, to overcome or substantially ameliorate the above disadvantages or, more generally, to provide an improved method for optimizing throughput of a network. More particular, the method of the present invention is adapted to provide, simultaneously, optimal throughput ($a_i$) for inelastic data flow, optimal proportional throughput ratio ($r_i$) for elastic data flow, and maximum network throughput.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENT

The present invention provides to a method for optimizing throughput of a network with stations adapted to transmit data to an access point, the method comprising the steps of: determining a respective required throughput ($\Gamma_i$) for each station (i) based on: respective time periods ($\Omega$) required for decreasing a count of a respective back-off counter associated with each of the stations (i), a transmission packet length ($L_i$) of the respective station (i), and a probability of successful transmission ($P_s^i$) of the respective station (i), wherein the respective required throughput ($\Gamma_i$) so determined is a function of a respective transmission attempt rate ($\beta_i$) for the station (i); and determining the respective transmission attempt rate ($\beta_i$) for each station (i) for maximizing a sum of the respective required throughput ($\Gamma_i$) such that a respective fixed throughput ($a_i$) is provided for inelastic data flow in the network, a respective proportional throughput ratio ($r_i$) is provided for elastic data flow in the network, and the throughput of the network is maximized.

I. System Model

IEEE 802.11ah an emerging wireless LAN (WLAN) protocol that can cover a longer transmission range and can support more stations compared with conventional 802.11 protocols. In particular, IEEE 802.11ah protocol can support more devices than conventional 802.11 protocols by dividing all stations into group and limiting each group in a specific time for transmission, wherein the stations in each group behave exactly like conventional 802.11 stations. Also, IEEE 802.11ah operates on the sub 1 GHz (S1G) license-exempt bands (except for TV white spaces). Because of the scarcity of the available spectrum, S1G does not permit the use of wide bands. For example, the channels used in 802.11ah are 10 times narrower than those in 802.11ac: 1, 2, 4, 8 and 16 MHz. Also, only 1 and 2 MHz channels are mandatory. As a result, in 802.11ah, the available bandwidth is generally very limited.

To facilitate understanding of the invention, the following description is made with reference to a small-scale IoT that adopts IEEE 802.11ah protocol. It should be noted that, however, the methods of the present invention are also applicable to various networks using other internet protocols.

In one exemplary IoT network that operates with IEEE 802.11ah protocol, all N stations are within the same group and therefore 802.11ah is reduced to the conventional 802.11 protocol. In these N stations, n stations have inelastic data flows and m stations have elastic data flows, where N=n+m. Each station i, $1 \leq i \leq N$, generates a random back-off count uniformly distributed in [0, $CW_i$] for each new transmission or retransmission, wherein $CW_i > 1$. All stations send data to an access point, which acts as a receiver.

In the following, it is assumed that 1) all stations hear each other; 2) channel conditions are ideal, i.e., the transmission errors are due to packet collision only; 3) each station is in saturated operation, i.e., each station always has packets to transmit; and 4) each station may have an arbitrary packet size.

The optimization problem associated with the above network can be formulated as follows. Let $\beta=(\beta_1, \beta_2, \ldots, \beta_N)$, where $\beta_i$ represents the attempt rate of station i (i.e., the mean number that station i attempts to transmit in a slot). In the saturated operation, $\beta_i$ is calculated by $CW_i$ based on $$\beta_i = \frac{2}{CW_i + 1}. \tag{1}$$

Thus, finding an optimal ($CW_1, CW_2, \ldots, CW_N$) is equivalent to finding the optimal $\beta$.

Let $\Gamma_i = \Gamma_i(\beta)$, $1 \leq i \leq n$ be the throughput of station i. Let $a_i$, $1 \leq i \leq n$, represent the fixed throughput required by inelastic data flow i. Let $r_i$, $1 \leq i \leq m$, represent the proportional throughput ratio between elastic data flow n+i and n+1. It is an object of the present invention to determine optimal $\beta$ values so as to ensure that each inelastic flow meets a fixed, optimized throughput requirement $a_i$, each elastic flow meets a proportional throughput requirement $r_i$, and the system throughput $\Sigma_{i=1}^N \Gamma_i$ can be maximized. These objects can be expressed as the following equations.

$$\text{The optimal } \beta = \text{argmax}_\beta \sum_{i=1}^{N} \Gamma_i \tag{2}$$

$$\text{over } \Gamma_i = a_i, 1 \leq i \leq n, \tag{3}$$

$$\frac{\Gamma_{n+i}}{\Gamma_{n+1}} = r_i, 1 \leq i \leq m. \tag{4}$$

II. Optimal Attempt Rate β

Per-Station Throughput $\Gamma_i$ for the Basic Mode of 802.11

For 802.11, let $\Omega$ be the time that elapses for one decrement of the back-off counter. According to the 802.11 protocol, the back-off counter of each station will count down if the channel is idle or will suspend if the channel is busy. Depending on the channel state, $\Omega$ can be written as:

$$\Omega = \begin{cases} \sigma, & P_e = \prod_{i=1}^{N}(1-\beta_i), \\ T_i, & P_i = \beta_i \prod_{j=i+1}^{N}(1-\beta_j), \quad 1 \leq i \leq N-1 \end{cases} \quad (5)$$

$P_e$ is the idle probability of a slot, namely, the probability that all stations do not transmit in a slot. Note that $\beta_i$ is the per-slot attempt rate (or attempt probability) of station i and $1-\beta_i$ is the probability that station i does not attempt to transmit in a slot. Thus, $P_e = \Pi_{i=1}^{N}(1-\beta_i)$.

$P_i$ is the probability that station i transmits but stations i+1 to N do not transmit. Note that it is irrelevant whether stations 1 to i−1 transmit. In addition, let $\Pi_{j=N+1}^{N}(1-\beta_j)=1$.

$\sigma$ is the time of a MAC slot. In 802.11b, $\sigma=20$ us. When the channel is idle for the duration of $\sigma$, the back-off count will decrease by 1.

$T_i$ is the channel occupation time (i.e., a successful or an unsuccessful packet transmission time) that when station i transmits but stations i+1 to N do not transmit. Let $L_i$ be the packet length in bytes of station i and assume that $L_1 \leq L_2 \leq \ldots \leq L_N$. When multiple packets involve collision, the collision time (i.e., the unsuccessful packet transmission time) is determined by the maximum packet length. In addition, it is assumed that both the successful and unsuccessful transmission times are equal. In the basic mode, one successful packet transmission follows the pattern: packet (including header overheads)/SIFS/ACK/DIFS. Then, $T_i = T(L_i)$ where $T(\bullet)$ is given in Table 1.

From Equation (5), the mean of $\Omega$, $E(\Omega)$, can be expressed as:

$$E(\Omega) = \sigma P_e + \Sigma_{i=1}^{N-1} T_i P_i. \quad (6)$$

Let $P_s^i$ be the probability of a successful transmission of station i, $1 \leq i \leq N$. Since station i can successfully transmit a packet if and only if all other stations do not transmit, $$P_s^i = \beta_i \Pi_{j \neq i}^{N}(1-\beta_j), 1 \leq i \leq N. \quad (7)$$

The throughput of station i, $\Gamma_i(\beta)$, $1 \leq i \leq N$ is defined as the number of bits that station i successfully transmits in the duration of $E(\Omega)$. According to Equations (6) and (7), $\Gamma_i$ can be written as $$\Gamma_i(\beta) = \frac{L_i P_s^i}{E(\Omega)}. \quad (8)$$

Per-Station Throughput $\Gamma_i$ for the RTS/CTS Mode of 802.11

In the RTS/CTS mode, the per-station throughput $\Gamma_i$ is calculated in a similar manner as in the basic mode. The only difference is the expression of $\Omega$, which is given by:

$$\Omega = \begin{cases} \sigma, & P_e \\ T_s^i, & P_s^i, \quad 1 \leq i \leq N, \\ T_c, & P_c \end{cases} \quad (9)$$

$P_e$ is the idle probability of a slot as defined above;

$P_s^i$ is the probability of a successful transmission of station i as defined above;

$P_c$ is the probability of an unsuccessful transmission of station i, which is given by $$P_c = 1 - \Sigma_{i=1}^{N} P_s^i - P_e. \quad (10);$$

$\sigma$ is the time of a MAC slot as defined above;

$T_s^i$ is the successful packet transmission time of station i. In the RTS/CTS mode, one successful packet transmission follows the pattern: RTS/SIFS/CTS/SIFS/packet/SIFS/ACK/DIFS. Then, $T_s^i$ can be written as $$T_s^i = RTS + SIFS + CTS + SIFS + T(L_i) \quad (11)$$

where $T(\bullet)$ is given in Table 1.

$T_c$ is an unsuccessful packet transmission time. In the RTS/CTS mode, if there is a collision, the collision only occurs in RTS. Then, $$T_c = DIFS + RTS + SIFS + CTS. \quad (12)$$

From Equation (9), the mean of $\Omega$, $E(\Omega)$ can be expressed as $$E(\Omega) = \sigma P_e + \Sigma_{i=1}^{N} T_s^i P_s^i + T_c P_c.$$

Network-Utility-Maximization (NUM) Method for a General Solution

A network-utility-maximization (NUM) method in accordance with one embodiment of the present invention can provide a general solution to the optimization problem for the basic and RTS/CTS modes of a 802.11 network.

Let $U_i(\beta)$ be the utility function of each flow i. In this method, the key is to express $U_i(\beta)$. In the following, the requirement of each flow is converted into a utility function.

Utility Function of Inelastic Data Flow i for $1 \leq i \leq n$

Each inelastic data flow i require a fixed throughput $a_i$, as shown in Equation (3). In other words, if the acquired throughput is less than $a_i$, the network cannot fulfill the requirement. If the acquired throughput is equal to $a_i$, the network exactly fulfills the requirement. If the acquired throughput is larger than $a_i$, the network fulfills the requirement but the over-allocation results in waste of resource. In this embodiment, a step function is used to characterize the utility of each inelastic data flow, namely, $$U_i(\beta) = \begin{cases} 1, & \text{if } \Gamma_i(\beta) \geq a_i, \\ 0, & \text{if } \Gamma_i(\beta) < a_i. \end{cases} \quad (13)$$

Utility Function of Elastic Data Flow i for $n+1 \leq i \leq n+m$

Each elastic data flow i requires a proportional throughput with a ratio $r_i$, as shown in Equation (4). Namely, the proportional throughput ratio between elastic data flow n+i and n+1 is $r_i$. In other words, each elastic data flow i requires a weighted proportional fairness. The utility function that can be used to achieve such a proportional fairness is a weighted log function, namely, $$U_i(\beta) = r_i \ln \Gamma_i(\beta). \quad (14)$$

Maximization of Utility Functions

In the optimization problem, given the requirement of each flow, the object is to maximize the system throughput $\Sigma_{i=1}^{N}\Gamma_i$, as shown in Equation (2). With the NUM method, maximizing the system throughput is equivalent to maximizing the total utility functions, namely, $$\max_\beta \Sigma_{i=1}^{n+m} U_i(\beta). \tag{15}$$

In general, the optimal $\beta_i$ for the basic and RTS/CTS modes can be found by solving Equations (13)-(15) numerically, as long as the solution exists. However, in some embodiments, it may be difficult to prove the existence of the solution and the search for an optimal solution is time-consuming. An alternative method may therefore be required.

Asymptotic Analysis Method for an Approximate Solution

An asymptotic analysis method in accordance with one embodiment of the present invention can provide approximate solution to the optimization problem for the basic and RTS/CTS modes of an 802.11 network. In the preferred embodiment, the asymptotic analysis method explicitly expresses the solution, therefore overcoming the potential drawbacks of the NUM method.

In one embodiment of the asymptotic analysis method, a key approximation, $\beta_i=1$, is adopted. This approximation is practical since $\beta_i$ represents the per-station attempt rate in a very short slot (e.g., 1 slot=20 us in 802.11b) and therefore it is generally small.

The following considers the simple case of n=1 and m≥1, and then extend the derived results to the general case of n≥1 and m≥1.

The case of n=1 and m≥1

With the approximation $\beta_i=1$, the per-station attempt rate $\beta_i$ can be expressed explicitly. The derived result is summarized in Theorem 1 below. Theorem 1 states that the approximate solution must exist and be unique, and provides a method to compute it quickly and easily.

Theorem 1: When n=1 and m≥1, with the approximation $\beta_i=1$, the optimal solution $\beta_i$ to Equations (2)-(4) is uniquely given by $$\begin{cases} \beta_i = \begin{cases} \dfrac{B + \sum_{j=1}^{m}(T_s^{j+1}-T_c)\beta_{j+1} + T_c e^\varphi}{A}, & i=1 \\ \dfrac{r_i \varphi}{L_{i+1}\sum_{j=1}^{m}\dfrac{r_j}{L_{j+1}}}, & i=2,\ldots,N \end{cases} \\ \varphi = W_0\left(\dfrac{B}{T_c e}\right)+1 \end{cases} \tag{16}$$

where $A = \dfrac{L_1}{a_1} + \sigma - T_s^1$, $B = \sigma - T_s^1$, and $\phi>0$ is the optimal total attempt rate of the stations with elastic data flows; and $W_0(\cdot)$ is one branch of the Lambert W(z) function, $W(z)e^{W(z)}=z$ for any complex number z.

Proof

Let $\varphi^\circ = \beta_2 \Sigma_{j=1}^{m} r_j$ represent the total attempt rate of the stations with elastic data flows.

Step 1: Express $\beta_{i+1}$ in terms of $\beta_2$. From Equations (4), (7), and (8), and since $\beta_i=1$, it can be determined that $$r_i = \frac{\Gamma_{n+i}}{\Gamma_{n+1}} = \frac{L_{n+i}\beta_{n+i}(1-\beta_{n+1})}{L_{n+1}\beta_{n+1}(1-\beta_{n+i})} \approx \frac{L_{n+i}\beta_{n+i}}{L_{n+1}\beta_{n+1}}. \tag{20}$$

When n=1, $\beta_{i+1}$ can be expressed as follows $$\beta_{i+1} = \frac{r_i L_2 \beta_2}{L_{i+1}} = \frac{r_i \varphi}{L_{i+1}\sum_{j=1}^{m}\dfrac{r_j}{L_{j+1}}}, \quad 1 \le i \le m. \tag{21}$$

Step 2: Express $\beta_i$ in Equation (16). $\Gamma_i=a_1$ is first expressed as Equation (22). After substituting Equation (21) into Equation (22), an explicit relationship between $\beta_1$ and $\beta_2$ can be obtained, as shown in Equation (23), where the following approximations are applied: $\beta_i=1$ and $(1-x)^y \approx e^{-xy}$ for x≪y. Combining Equations (21) and (23), Equation (16) can be obtained:

$$a_1 = \frac{L_i \beta_i \prod_{j\ne i}^{N}(1-\beta_j)}{(\sigma-T_c)\prod_{i=1}^{N}(1-\beta_i) + \sum_{i=1}^{N}(T_s^i-T_c)\beta_i \prod_{j\ne i}^{N}(1-\beta_j) + T_c}. \tag{22}$$

$$\beta_1 = \frac{\sigma - T_c + \sum_{i=1}^{m}(T_s^{i+1}-T_c)\beta_{i+1} + \dfrac{T_c}{\prod_{i=1}^{m}(1-\beta_{i+1})}}{\dfrac{L_1}{a_1} + \sigma - T_s^1} \tag{23}$$

$$\approx \frac{\sigma - T_c + \dfrac{\varphi}{\sum_{j=1}^{m}\dfrac{r_j}{L_{j+1}}}\sum_{i=1}^{m}(T_s^{i+1}-T_c)\dfrac{r_i}{L_{i+1}} + T_c e^\varphi}{\dfrac{L_1}{a_1} + \sigma - T_s^1}, \tag{24}$$

$$1 \le i \le m.$$

$$\sum_{i=1}^{N}\Gamma_i = a_1 + \frac{\beta_2}{\beta_1} a_1 \sum_{i=1}^{m} r_i \tag{25}$$

$$= a_1 + \frac{\left(\dfrac{L_1}{a_1}+\sigma-T_s^1\right)\dfrac{\varphi}{\sum_{j=1}^{m}\dfrac{r_j}{L_{j+1}}}a_1\sum_{i=1}^{m}r_i}{\sigma - T_c + \dfrac{\varphi}{\sum_{j=1}^{m}\dfrac{r_j}{L_{j+1}}}\sum_{i=1}^{m}(T_s^{i+1}-T_c)\dfrac{r_i}{L_{i+1}} + T_c e^\varphi} \tag{26}$$

Step 3: Compute the optimal $\varphi^\circ$, $\varphi$. First, $\Sigma_{i=1}^{N}\Gamma_i$ is expressed as in Equations (25) and (26) by applying Equation (21). Second, by setting the first-order derivative of $\Sigma_{i=1}^{N}\Gamma_i$ in terms of $\phi$ to 0, the following can be obtained: the equation of $\phi$, $B + T_c(e^\varphi - \varphi e^\varphi) = 0$, and hence $$(\varphi - 1)e^{\varphi - 1} = \frac{B}{T_c e}.$$

Then $$\varphi - 1 = W_0\left(\frac{B}{T_c e}\right) \text{ or } W_{-1}\left(\frac{B}{T_c e}\right).$$

-continued $$\varphi = W_0\left(\frac{B}{T_c e}\right) + 1, \text{ as } W_0\left(\frac{B}{T_c e}\right) > -1 \text{ and } W_{-1}\left(\frac{B}{T_c e}\right) < -1 \text{ for}$$

$$\frac{B}{T_c e} \in \left(\frac{-1}{e}, 0\right).$$

The case of $n \geq 1$ and $m \geq 1$

Theorem 1 states that for the given $L_1$ and $a_1$, the total attempt rate $\varphi$ of all stations with elastic data flows is fixed. This reveals the idea of computing the approximate solution when $n \geq 1$, as explained below.

First, express $\beta_i$ for the inelastic data flows in terms of $\beta_2$.

$$\beta_i = \frac{L_2 a_i}{a_2 L_i} \beta_2, \ 2 \leq i \leq n. \tag{17}$$

Next, express $\beta_{n+i}$ for elastic data flows in terms of $\beta_2$.

$$\beta_{n+i} = \frac{r_i\left(\varphi - \frac{L_2}{a_2}\beta_2 \sum_{j=2}^{n} \frac{a_j}{L_j}\right)}{L_{n+i} \sum_{j=1}^{m} \frac{r_j}{L_{n+j}}}, \ 1 \leq i \leq m. \tag{18}$$

Then, compute $\beta_2$. Note that $\beta_1$ can be rewritten as Equation (19) following Theorem 1, and can be further expressed in terms of $\beta_2$ after substituting Equations (17) and (18) into Equation (19). Then compute $\beta_2$ using $\beta_1$ in Equations (17) and (19).

$$\beta_1 = \frac{B + \sum_{j=1}^{m}(T_s^{j+1} - T_c)\beta_{j+1} + T_c e^{\varphi}}{A} \tag{19}$$

Finally, the other $\beta_i$ can be computed using Equations (17) and (18), once $\beta_2$ is obtained.

III. Model Verification

The following provides verification of the performance of the proposed methods operating in, for example, a smart home network 100 as illustrated in Error! Reference source not found. FIG. 1. In the simulation, the 802.11e EDCA simulator in NS2 version 2.28 is used as a validation tool. Only CW parameter is differentiated. For each station i, set AIFS=DIFS, TX0P=0, and $$CW_{min} = CW_{max} = CW_i = \left[\frac{2}{\beta_i} - 1\right],$$

where [•] is the round operation. In the NUM method, the optimal $\beta_i$ is obtained by an exhaustive algorithm, where all possible values of $\beta_1$ between 0 and 1 are searched with a step size of 0.0001. In the asymptotic analysis, the optimal $\beta_i$ is calculated using Equations (17) and (18). The other protocol parameter values are listed in Table 1 and are set according to IEEE 802.11b protocol. Each simulation value is an average over five simulation runs, where each run runs for 200 seconds.

TABLE 1

Parameters for 802.11b.

| m/M | 5/7 | Header | 228 μs = | Mheader + Pheader |
|---|---|---|---|---|
| σ | 20 μs | T(L) = | | Header + $L_{tm}$(L) + SIFS + ACK + DIFS |
| SIFS | 10 μs | $L_{tm}$(L) = | | L bytes @ $R_{data}$ |
| DIFS | 50 μs | ACK | 304 μs = | 24 bytes @ $R_{basic}$ + 14 bytes @ $R_{basic}$ |
| $R_{data}$ | 11 Mbps | Mheader | 20 μs = | 24 bytes @ $R_{data}$ + 4 bytes @ $R_{data}$ |
| $R_{basic}$ | 1 Mbps | Pheader | 208 μs = | 26 bytes @ $R_{basic}$ |

Validation of the Methods of the Present Invention

In this section, the effectiveness of the proposed NUM method and the proposed asymptotic analysis method is validated.

In the experiment setting, the smart home network consists of n=2 surveillance cameras with inelastic data flows and m devices with elastic data flows. Each inelastic data flow has a fixed throughput requirement (i.e., $a_1$=0.4 Mbps and $a_2$=0.8 Mbps) and has the same packet size (i.e., $L_1=L_2$=1000 bytes). Each elastic data flow i, $1 \leq i \leq m$, has a proportional throughput requirement (i.e., $r_i$=1), where the packet size is set to 100 bytes for the former m/2 elastic data flows and is set to 200 bytes for the latter m/2 elastic data flows. In simulation, the CW size of each flow i, $CW_i$, is listed in Table 2.

TABLE 2

$CW_i$ and system throughput.

| | NUM (basic mode) | | | | | NUM (RTS/CTS mode) | | | | |
|---|---|---|---|---|---|---|---|---|---|---|
| m (n = 2) | $CW_1$ | $CW_2$ | $CW_1$ (i = 3, ... 2 + m/2) | $CW_1$ (i = 3 + m/2, ... 2 + m) | system throughput [unit: Mbps] | $CW_1$ | $CW_2$ | $CW_1$ (i = 3, ... 2 + m/2) | $CW_1$ (i = 3 + m/2, ... 2 + m) | system throughput [unit: Mbps] |
| 2 | 249 | 124 | 20 | 42 | 2.2126 | 317 | 58 | 20 | 43 | 1.6946 |
| 4 | 181 | 90 | 29 | 60 | 2.2086 | 99 | 49 | 33 | 68 | 1.6936 |
| 6 | 166 | 82 | 41 | 82 | 2.2031 | 94 | 47 | 48 | 97 | 1.6928 |

TABLE 2-continued

CW$_i$ and system throughput.

| 8  | 166 | 82 | 55 | 130 | 2.2037 | 304 | 52 | 70 | 142 | 3.6918 |
|----|-----|----|----|-----|--------|-----|----|----|-----|--------|
| 10 | 166 | 82 | 68 | 137 | 2.1954 | 90  | 44 | 76 | 153 | 1.6916 |
| 12 | 181 | 90 | 90 | 181 | 2.2023 | 90  | 44 | 94 | 189 | 1.7150 |

| | | | Asymptotic (RTS/CTS mode) | | |
|---|---|---|---|---|---|
| m (n = 2) | CW$_1$ | CW$_2$ | CW$_i$ (i = 3, ... 2 + m/2) | CW$_i$ (i = 3 + m/2, ... 2 + m) | system throughput [unit: Mbps] |
| 2  | 99 | 49 | 16 | 32  | 1.6810 |
| 4  | 99 | 49 | 32 | 66  | 1.6810 |
| 6  | 99 | 49 | 49 | 99  | 1.6810 |
| 8  | 99 | 49 | 66 | 133 | 1.6810 |
| 10 | 99 | 49 | 82 | 166 | 1.6810 |
| 12 | 99 | 49 | 99 | 199 | 1.6810 |

In FIGS. 2A-3C, the labels "ana_NUM" and "ana_Asym", respectively, denote the theoretical throughputs from the NUM method and the asymptotic analysis. The labels "sim_NUM" and "sim_Asym", respectively, denote the corresponding simulation results.

Results for NUM Method in Basic Mode

Figure 2A:
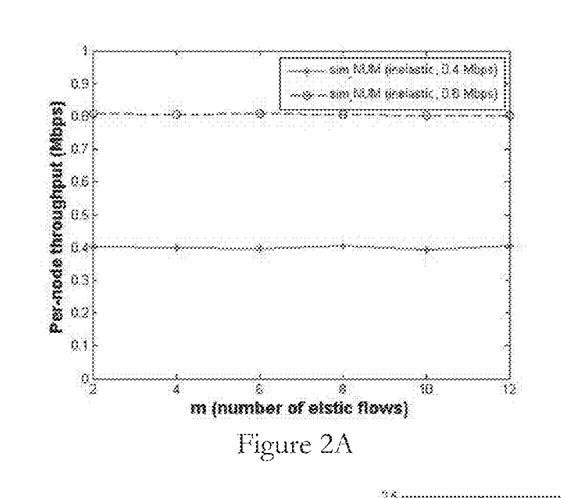
FIG. 2A is a graph showing simulation results for operating a network using a network-utility-maximization-based method in a basic mode in accordance with one embodiment of the present invention, wherein the graph shows a relationship between the per-station throughput of the inelastic data flows and the number of the elastic data flows.

FIG. 2A plots the per-station throughput of the inelastic data flows against the number of the elastic data flows. From this figure, it can be seen that for each inelastic data flow, the simulation result is almost always equal to the corresponding target value (i.e., $a_1$=0.4 Mbps or $a_2$=0.8 Mbps), regardless of the number of the elastic data flows. This manifests that the NUM method in the embodiment of the present invention can guarantee fixed throughput requirements of the inelastic data flows.

Figure 2B:
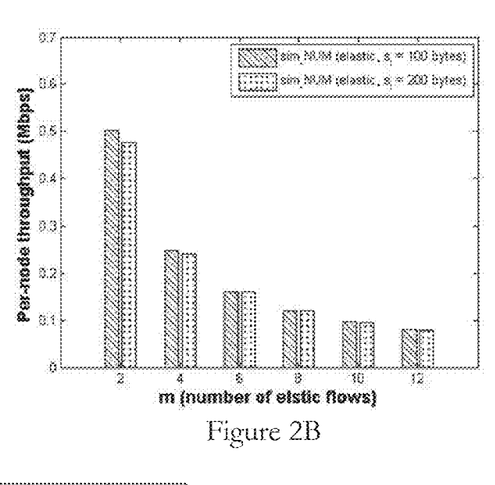
FIG. 2B is a graph showing simulation results for operating a network using a network-utility-maximization-based method in a basic mode in accordance with one embodiment of the present invention, wherein the graph shows a relationship between the per-station throughput of the elastic data flows and the number of the elastic data flows.

FIG. 2B plots the per-station throughput of the elastic data flows against the number m of the elastic data flows. From this figure, it can be seen that as m increases from 2 to 16, the per-station throughput of each elastic data flow decreases. It is also observed that, given m, the simulated throughput ratio between the former and latter (m/2) elastic data flows is about 1:1, regardless of the difference in packet size. This manifests that the NUM method in the embodiment of the present invention can achieve proportional fairness for elastic data flows.

Figure 2C:
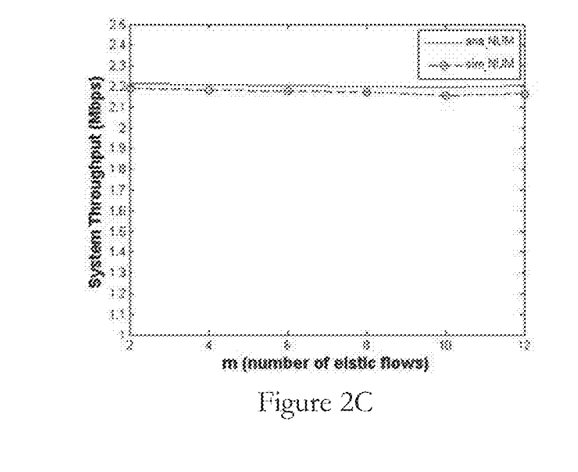
FIG. 2C is a graph showing simulation and analysis results for operating a network using a network-utility-maximization-based method in a basic mode in accordance with one embodiment of the present invention, wherein the graph shows a relationship between the system throughput and the number of the elastic data flows.

FIG. 2C plots the system throughput against the number of the elastic data flows. From this figure, it can be seen that the simulation curve well matches with the analysis curve which plots the maximum system throughput limit. This manifests that the NUM method in the embodiment of the present invention can maximize the system throughput, while fulfilling the throughput requirements.

Results for NUM and Asymptotic Analysis Methods in RTS/CTS Mode

Figure 3A:
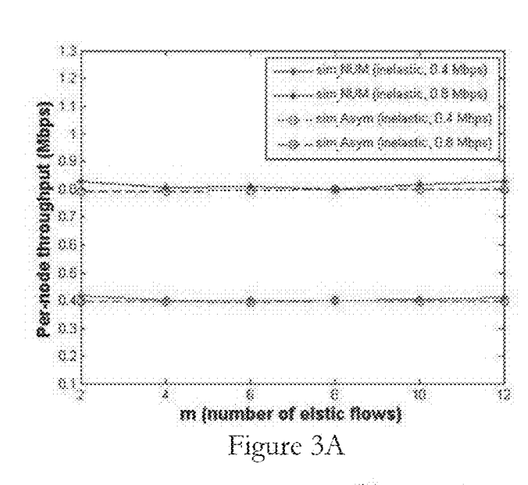
FIG. 3A is a graph showing simulation results for operating a network using a network-utility-maximization-based method and an asymptotic analysis method in a RTS/CTS mode in accordance with one embodiment of the present invention, wherein the graph shows a relationship between the per-station throughput of the inelastic data flows and the number of the elastic data flows.

FIG. 3A plots the per-station throughput of the inelastic data flows against the number m of the elastic data flows. From this figure, it can be seen that as m increases from 2 to 16, the simulation values based on the NUM method and the asymptotic analysis are almost equal to the corresponding target values, which are either 0.4 Mbps or 0.8 Mbps. It can also be observed that for each inelastic data flow, the sim_NUM curve well matches with the sim_Asym curve. This manifests that both methods in the embodiments of the present invention can guarantee the fixed throughput requirements of the inelastic data flows.

Figure 3B:
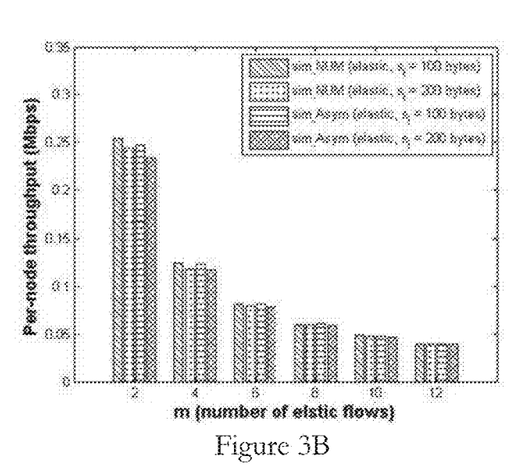
FIG. 3B is a graph showing simulation results for operating a network using a network-utility-maximization-based method and an asymptotic analysis method in a RTS/CTS mode in accordance with one embodiment of the present invention, wherein the graph shows a relationship between the per-station throughput of the elastic data flows and the number of the elastic data flows.

FIG. 3B plots the per-station throughput of the elastic data flows against the number m of the elastic data flows. From this figure, it can be observed that as m varies from 2 to 16, the per-station throughput of each elastic data flow decreases. It can also be seen that, given m, the simulated throughput ratio between the former and latter (m/2) elastic data flows is about 1:1 for the NUM method and the asymptotic analysis method. This manifests that both methods in the embodiments of the present invention can achieve proportional fairness for elastic data flows.

Figure 3C:
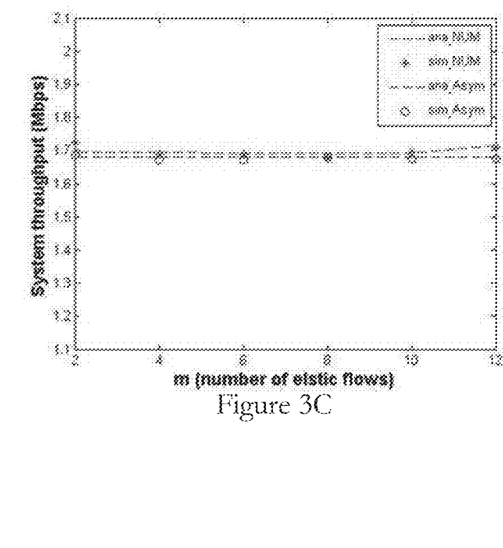
FIG. 3C is a graph showing simulation and analysis results for operating a network using a network-utility-maximization-based method and an asymptotic analysis method in a RTS/CTS mode in accordance with one embodiment of the present invention, wherein the graph shows a relationship between the system throughput and the number of the elastic data flows.

FIG. 3C plots the system throughput against the number of the elastic data flows. From this figure, it can be seen that for each method, the simulation curve well matches with the analysis curve which plots the maximum system throughput limit. This manifests that both methods in the embodiments of the present invention can maximize the system throughput, while fulfilling the throughput requirements.

Comparison with Prior Work (Cheung)

The proposed NUM method is further compared with the method disclosed in M. H. Cheung, H. Mohsenian-Rad, V. W. Wong, and R. Schober, "Utility-optimal random access for wireless multimedia networks," Wireless Communications Letters, IEEE, vol. 1, no. 4, pp. 340-343, 2012 (referred to as "Cheung's method") for the basic mode.

Figure 4A:
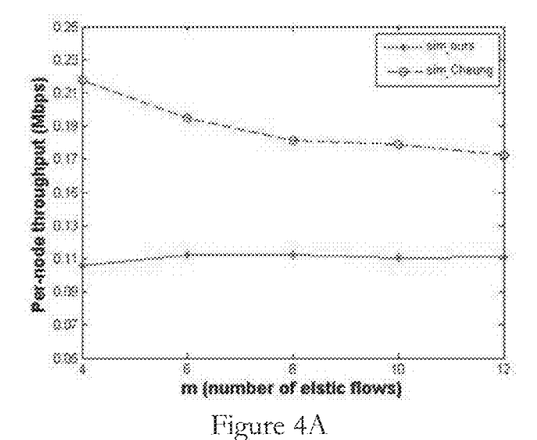
FIG. 4A is a graph showing simulation results for operating a network using the network-utility-maximization-based method in a basic mode in accordance with the present invention and using a prior art method (Cheung's method), wherein the graph shows a relationship between the per-station throughput of the inelastic data flow and the number of the elastic data flows.
Figure 4B:
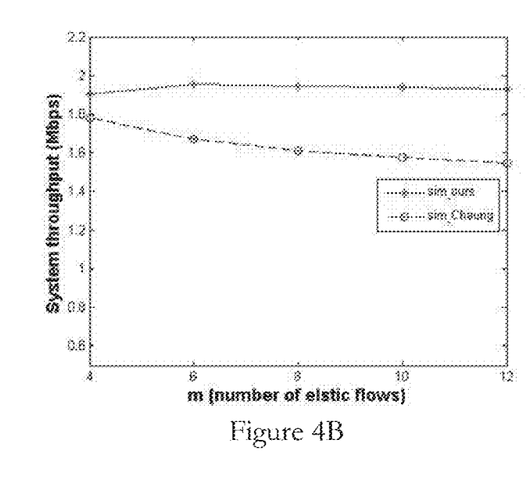
FIG. 4B is a graph showing simulation results for operating a network using the network-utility-maximization-based method in a basic mode in accordance with the present invention and using a prior art method (Cheung's method), wherein the graph shows a relationship between the system throughput and the number of the elastic data flows.
Figure 4C:
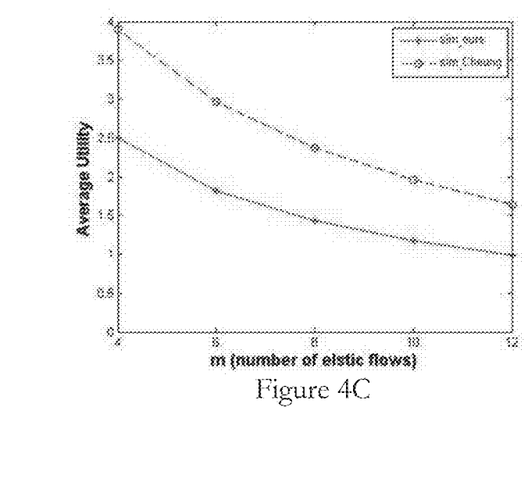
FIG. 4C is a graph showing simulation results for operating a network using the network-utility-maximization-based method in a basic mode in accordance with the present invention and using a prior art method (Cheung's method), wherein the graph shows a relationship between an average utility and the number of elastic data flows.

For the proposed NUM method of the present invention, the same experiment is repeated except that each inelastic data flow has the same fixed throughput requirement (i.e., $a_1$=$a_2$=0.11 Mbps), and each elastic data flow i, has the same packet size (i.e., $L_{n+i}$=200 bytes). For Cheung's method, the same traffic parameters and requirements are adopted, but using their default method parameters. In FIGS. 4A-4C, the labels "sim_ours" and "sim_Cheung", respectively, denote the results of the NUM method of the present invention and the results from Cheung's method.

FIG. 4A compares the per-station throughput of the inelastic data flow between the NUM method of the present invention and Cheung's method. From this figure, it can be seen that as m increases from 4 to 16, the NUM method of the present invention can allocate each inelastic data flow neither more nor less than what it requires (i.e., 0.11 Mbps). However, Cheung's method over-allocates each inelastic data flow what it requires (e.g., as m increases from 4 to 16, the acquired throughput of each inelastic data flow is always larger than 0.17 Mbps).

FIG. 4B compares the system throughput between the NUM method of the present invention and Cheung's method. From this figure, it can be seen that the NUM method of the present invention achieves a higher throughput than Cheung's method. This manifests that the NUM method of the present invention can maximize the system throughput (as validated in FIGS. 2C and 3C), while Cheung's method fails to do so.

FIG. 4C compares the average utility value between the NUM method of the present invention and Cheung's method which adopts the NUM method as well. From this figure, it can be seen that Cheung's method achieves a higher utility than the NUM method of the present invention, but achieves a lower throughput than the NUM method of the present invention (shown in FIG. 4B), which violates the principle of the NUM method. This casts doubts on the performance of Cheung's method.

IV. System for Performing the Methods of the Present Invention

Figure 5:
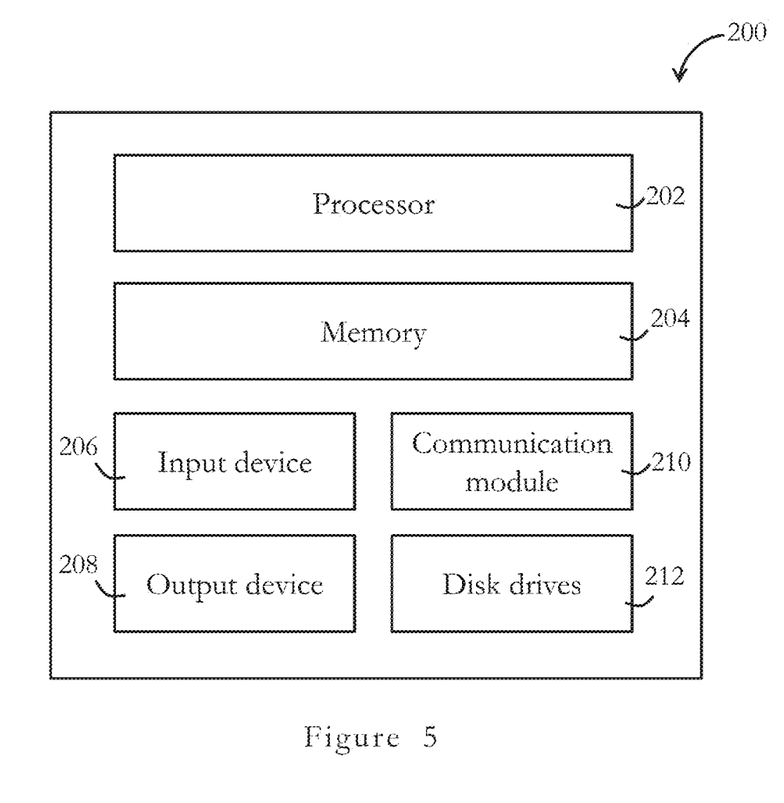
FIG. 5 is a functional block diagram of an exemplary information handling system operable to perform the optimization methods (network-utility-maximization-based method and asymptotic analysis method) of the present invention.

Referring to FIG. 5, there is shown a schematic diagram of an exemplary information handling system 200 that can be used for implementing embodiments of the NUM and asymptotic analysis methods of the present invention as described above. In one example, the information handling system 200 may be used in network 100. In this example, the information handling system 200 is operable to be in communication with the surveillance camera 102, the smart lamp 104, the smart air-conditioner 106, and the smoke detector 108 in the same home environment for coordinating data transmission to the gateway 112.

The information handling system 200 may have different configurations, and it generally comprises suitable components necessary to receive, store and execute appropriate computer instructions or codes. The main components of the information handling system 200 are a processing unit 202 and a memory unit 204. The processing unit 202 is a processor such as a CPU, an MCU, etc. The memory unit 204 may include a volatile memory unit (such as RAM), a non-volatile unit (such as ROM, EPROM, EEPROM and flash memory) or both. Preferably, the information handling system 200 further includes one or more input devices 206 such as a keyboard, a mouse, a stylus, a microphone, a tactile input device (e.g., touch sensitive screen) and a video input device (e.g., camera). The information handling system 200 may further include one or more output devices 208 such as one or more displays, speakers, disk drives, and printers. The displays may be a liquid crystal display, a light emitting display or any other suitable display that may or may not be touch sensitive. The information handling system 200 may further include one or more disk drives 212 which may encompass solid state drives, hard disk drives, optical drives and/or magnetic tape drives. A suitable operating system may be installed in the information handling system 200, e.g., on the disk drive 212 or in the memory unit 204 of the information handling system 200. The memory unit 204 and the disk drive 212 may be operated by the processing unit 202. The information handling system 200 also preferably includes a communication module 210 for establishing one or more communication links (not shown) with one or more other computing devices such as an information handling system, personal computers, terminals, wireless or handheld computing devices. In one example, the communication module 210 allows data communication between the information handling system 200 and the surveillance camera 102, the smart lamp 104, the smart air-conditioner 106, and the smoke detector 108. The communication module 210 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 202, the memory unit 204, and optionally the input devices 206, the output devices 208, the communication module 210 and the disk drives 212 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the information handling system 200 shown in FIG. 5 is merely exemplary, and that different information handling system s 200 may have different configurations and still be applicable to implement the method in the embodiments of the present invention.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

The methods of the present invention simultaneously guarantee optimal throughput ($a_i$) for inelastic data flow, optimal proportional throughput ratio ($r_i$) for elastic data flow, and maximum network throughput. As such, the methods of the present invention provide a simple yet efficient MAC design dedicated to economically and intelligently allocate bandwidth for heterogeneous traffic when inelastic and elastic data flows coexist. The methods of the present invention are particularly advantageous for optimizing throughput in network with limited bandwidth, such as but not limited to network operating with IEEE 802.11 protocol.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for optimizing throughput of a network with stations adapted to transmit data to an access point, the method comprising the steps of:
   determining, using one or more processors, a respective required throughput ($\Gamma_i$) for each station (i) based on:
      respective time periods ($\Omega$) required for decreasing a count of a respective back-off counter associated with each of the stations (i),
      a transmission packet length ($L_i$) of the respective station (i), and a probability of successful transmission ($P_s^i$) of the respective station (i), wherein the respective required throughput ($\Gamma_i$) so determined is a function of a respective transmission attempt rate ($\beta_i$) for the station (i); and determining, using the one or more processors, the respective transmission attempt rate ($\beta_i$) for each station (i) for maximizing a sum of the respective required throughput ($\Gamma_i$) such that a respective fixed throughput ($a_i$) is provided for inelastic data flow in the network, a respective proportional throughput ratio ($r_i$) is provided for elastic data flow in the network, and the throughput of the network is maximized.

2. The method in accordance with claim 1, further comprising the step of: operating the stations (i) at the respective determined transmission attempt rate ($\beta_i$).

3. The method in accordance with claim 1, wherein the fixed throughputs ($a_i$) are respective predetermined throughputs for maintaining inelastic data flow in the respective stations.

4. The method in accordance with claim 1, wherein the respective proportional throughput ratio ($r_i$) is defined as a ratio of a throughput of one of the station with elastic data flow to a throughput of another of the station with elastic data flow.

5. The method in accordance with claim 1, further comprising the step of:

determining or selecting, using the one or more processors, an operation mode of the network.

6. The method in accordance with claim 5, wherein the operation mode is selected from a basic mode and a RTS/CTS mode.

7. The method in accordance with claim 6, wherein in the basic mode, the respective time periods ($\Omega$) is defined by:

$$\Omega = \begin{cases} \sigma, & P_e = \prod_{i=1}^{N}(1-\beta_i), \\ T_i, & P_i = \beta_i \prod_{j=i+1}^{N}(1-\beta_j), 1 \le i \le N-1 \end{cases};$$

and in the RTS/CTS mode, the respective time periods ($\Omega$) is defined by:

$$\Omega = \begin{cases} \sigma, & P_e \\ T_s^i, & P_s^i, 1 \le i \le N \\ T_c, & P_c \end{cases},$$

where N is a total number of the stations;

$\sigma$ is a predetermined time constant;

$P_e$ is an idle probability that all of the stations do not transmit in a slot;

$T_i$ is a channel occupation time that when one station i transmits but other stations i+1 to N do not transmit;

$P_i$ is a probability that one station i transmits but other stations i+1 to N do not transmit, with $\Pi_{j=N+1}^{N}(1-\beta_j)=1$;

$T_s^i$ is the successful packet transmission time of station i;

$P_s^i$ is the probability of a successful transmission of station i;

$T_c$ is an unsuccessful packet transmission time; and $P_c$ is the probability of an unsuccessful transmission of station i.

8. The method in accordance with claim 7, wherein the respective required throughput ($\Gamma_i$) for each station (i) is expressed as:

$$\Gamma_i(\beta) = \frac{L_i P_s^i}{E(\Omega)},$$

where $P_s^i = \beta_i \Pi_{j \ne 1}^{N}(1-\beta_j), 1 \le i \le N$; $E(\Omega) = \sigma P_e + \Sigma_{i=1}^{N-1} T_i P_i$ for the basic mode; and $E(\Omega) = \sigma P_e + \Sigma_{i=1}^{N} T_s^i P_s^i + T_c P_c$ for the RTS/CTS mode.

9. The method in accordance with claim 8, wherein the step of determining a respective transmission attempt rate ($\beta_i$) for each station (i) comprises the steps of:

processing the respective required throughput ($\Gamma_i$) for each station (i) with a utility function for elastic data flow and inelastic data flow; and determining a respective transmission attempt rate ($\beta_i$) for each station (i) for maximizing the utility functions.

10. The method in accordance with claim 9, wherein the step of processing the respective required throughput ($\Gamma_i$) for each station (i) with a utility function is performed based on:

$$U_i(\beta) = \begin{cases} 1, & \text{if } \Gamma_i(\beta) \ge a_i \\ 0, & \text{if } \Gamma_i(\beta) < a_i \end{cases} \text{ for inelastic data flow; and}$$

$$U_i(\beta) = r_i \ln \Gamma_i(\beta) \text{ for elastic data flow;}$$

where $U_i(\beta)$ is the utility function.

11. The method in accordance with claim 8, wherein the step of determining a respective transmission attempt rate ($\beta_i$) for each station (i) comprises the steps of:

setting an initial transmission attempt rate;

determining the respective transmission attempt rate ($\beta_i$) based on the initially set transmission attempt rate, the respective required throughput ($\Gamma_i$) for each station (i), and a predetermined relationship.

12. The method in accordance with claim 11, wherein the predetermined relationship is defined as:

$$\beta_i = \frac{B + \sum_{j=1}^{m}(T_s^{j+1} - T_c)\beta_{j+1} + T_c e^{\varphi}}{A}$$

$$\beta_i = \frac{L_2 a_i}{a_2 L_i}\beta_2, 2 \le i \le n \quad \text{for inelastic data flow; and}$$

$$\beta_{n+i} = \frac{r_i \left(\varphi - \frac{L_2}{a_2}\beta_2 \sum_{j=2}^{n}\frac{a_j}{L_j}\right)}{L_{n+i}\sum_{j=1}^{m}\frac{r_j}{L_{n+j}}}, 1 \le i \le m \quad \text{for elastic data flow;}$$

where $= \frac{L_1}{a_1} + \sigma - T_s^1$, $B = \sigma - T_s^1$, and $\varphi > 0$ is an optimal total attempt rate of the stations with elastic data flow.

13. The method in accordance with claim 1, wherein the elastic data flow is a non-real-time data flow and the inelastic data flow is a real-time data flow.

14. The method in accordance with claim 1, wherein the network utilizes an IEEE 802.11 protocol.

15. The method in accordance with claim 1, wherein the network utilizes an IEEE 802.11ah protocol.

16. A non-transient computer readable medium for storing computer instructions that, when executed by one or more processors, causes the one or more processors to perform a method for optimizing throughput of a network with stations adapted to transmit data to an access point, the method comprising the steps of:

determining a respective required throughput ($\Gamma_i$) for each station (i) based on:
respective time periods ($\Omega$) required for decreasing a count of a respective back-off counter associated with each of the stations (i),
a transmission packet length ($L_i$) of the respective station (i), and
a probability of successful transmission ($P_s^i$) of the respective station (i),
wherein the respective required throughput ($\Gamma_i$) so determined is a function of a respective transmission attempt rate ($\beta_i$) for the station (i); and
determining the respective transmission attempt rate ($\beta_i$) for each station (i) for maximizing a sum of the respective required throughput ($\Gamma_i$) such that a respective fixed throughput ($a_i$) is provided for inelastic data flow in the network, a respective proportional throughput ratio ($r_i$) is provided for elastic data flow in the network, and the throughput of the network is maximized.

* * * * *